(12) United States Patent
Nguyen

(10) Patent No.: US 11,667,060 B2
(45) Date of Patent: *Jun. 6, 2023

(54) HYDRAULIC ADVANCEMENT/POSTPONEMENT ASSEMBLY

(71) Applicant: NYPROMOLD INC., Clinton, MA (US)

(72) Inventor: Tuan H. Nguyen, Clinton, MA (US)

(73) Assignee: NyproMold Inc., Clinton, MA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/366,526

(22) Filed: Jul. 2, 2021

(65) Prior Publication Data

US 2021/0331352 A1 Oct. 28, 2021

Related U.S. Application Data

(63) Continuation of application No. 16/179,555, filed on Nov. 2, 2018, now Pat. No. 11,052,576, which is a continuation of application No. PCT/US2017/030855, filed on May 3, 2017.

(60) Provisional application No. 62/331,779, filed on May 4, 2016.

(51) Int. Cl.
*B29C 33/44* (2006.01)
*B29C 45/40* (2006.01)

(52) U.S. Cl.
CPC ........ *B29C 33/442* (2013.01); *B29C 45/4005* (2013.01); *B29C 2045/4084* (2013.01)

(58) Field of Classification Search
CPC .... B29C 2045/4084; B29C 2045/4073; B29C 45/4005; B29C 45/40; B29C 33/46; B29C 33/442; B29C 33/444; B29C 45/17; B29C 2045/4031; B29C 2045/4042; B29C 2045/4047; B29C 2045/4052; B29C 2045/6785

See application file for complete search history.

(56) References Cited

U.S. PATENT DOCUMENTS

| 4,866,937 A * | 9/1989 | Leigh-Monstevens ...................... F15B 7/005 60/572 |
| 2005/0129805 A1* | 6/2005 | Jeanjean ............. B29C 45/6771 425/595 |
| 2009/0025577 A1* | 1/2009 | Aoki ........................ B30B 1/32 100/269.18 |
| 2015/0140160 A1* | 5/2015 | Nguyen ............. B29C 33/0088 425/588 |

(Continued)

*Primary Examiner* — Leith S Shafi
*Assistant Examiner* — Inja Song
(74) *Attorney, Agent, or Firm* — Duquette Law Group

(57) ABSTRACT

A hydraulic advancement/postponement assembly is operably coupled to a first ejector plate and to a second ejector plate. The hydraulic advancement/postponement assembly includes a first hydraulic cylinder having a first housing defining a first volume and a first piston, the first housing connected to the first ejector plate and the first piston connected to a fixed element. The hydraulic advancement/postponement assembly includes a second hydraulic cylinder disposed in fluid communication with the first hydraulic cylinder, the second hydraulic cylinder having a second housing defining a second volume and a second piston, the second housing connected to the first ejector plate and a second piston connected to the second ejector plate.

14 Claims, 7 Drawing Sheets

(56) References Cited

U.S. PATENT DOCUMENTS

2017/0241446 A1* 8/2017 Luepke .................. F16H 25/20

* cited by examiner

HYDRAULIC ADVANCEMENT/POSTPONEMENT ASSEMBLY

RELATED APPLICATIONS

This patent application is a continuation of U.S. Utility application Ser. No. 16/179,555, filed on Nov. 2, 2018, entitled "Hydraulic Advancement/Postponement Assembly," which is a continuation of PCT Application No. PCT/US2017/030855 filed on May 3, 2017, entitled "Hydraulic Advancement/Postponement Assembly," which claims the benefit of U.S. Provisional Application No. 62/331,779, filed on May 4, 2016, entitled "Hydraulic Accelerator Assembly," the contents and teachings of each of which are hereby incorporated by reference in their entirety.

BACKGROUND

In a typical injection molding process, plasticized material is forced into a closed mold where it then cools and hardens into a molded article. Conventional injection molds can include an ejector device, such as a set of ejector pins, configured to remove the molded article from the mold once the article has hardened. Certain injection molds can further include an ejector accelerator mechanism and/or a delay mechanism, which operates in conjunction with the ejector device, to increase the velocity of a portion of a molded article or delay another portion of the molded article in order to remove a molded article from a mold in different order. The ejector accelerator or the ejector delay is responsive to the relative motion between a movable mold plate of the injection mold and the ejector plate.

Conventional ejector accelerators include mechanical components which aid in the relative motion between the mold plate and the ejector plate. For example, one conventional ejector accelerator 15 is illustrated in FIG. 1. The ejector accelerator 15 includes a pair of parallel racks 154, 156 having toothed surfaces 162, 164 coupled by a pinion 166. As illustrated, a first rack 156 is coupled to an ejector pin 176 and a second rack 154 is actuated by a movable mold plate 110 during operation. The racks 154, 156 and pinion 166 are arranged so that one rack advances in response, and in proportion, to the retraction of the other rack. For example, the mold plate 110 moves along direction 170 until a stationary shaft 144 makes contact with an ejector base plate 134.

Further retraction of the mold plate 110 positions the second rack 154 against rod 178 to produce a downward motion of the second rack 154 along direction 170 relative to the ejector accelerator 15. This motion of the first rack 154 causes the first rack 156 and ejector pin 176 connected thereto to be advanced along direction 172 at a velocity that is twice the velocity of pins 138, 139. The end of the molded part contacting pin 176 is therefore advanced at twice its previous rate and at twice the velocity of pins 138, 139. As a result, the contacting pin 176 pivots a molded article 122 away from the central pin 319 and ejects the article 122 from the mold plate 110.

SUMMARY

The configuration of the ejector accelerator as a mechanical structure, such as a rack and pinion, suffers from a variety of deficiencies. For example, standard clearances and manufacturing tolerances of the rack and pinion components create small variations in gear tooth size and pitch between the rack and pinion mechanisms. However, such variations cause the interacting surfaces of the meshing portions of the rack and pinion components to form small gaps or spaces there between. The spaces can allow a limited amount of slack or backlash to enter into the ejector accelerator during operation of the rack and pinion mechanisms. With the presence of the backlash, the gears of the rack and pinion mechanisms are prone to wear and can require constant lubrication. Accordingly, conventional ejector accelerators can be expensive to maintain.

Additionally, mechanical structures, such as rack and pinion mechanisms, limit the speed at which the ejector accelerator can translate. Modern manufacturing practices require relatively fast operating speeds for the injection molds. The operating speed of the rack and pinion ejection accelerator, however, is limited by the relative tooth pitch of the pinion and racks. Further, increasing the operating speed of the rack and pinion mechanism can increase the wear rate of the mechanical components. For example, increased operating speed can lead to an increase in the sudden loading, and the change in direction of the loading, as applied to the rack and pinion components.

By contrast to conventional ejector accelerators, embodiments of the present innovation relate to a hydraulic advancement/postponement assembly. The hydraulic advancement/postponement assembly can include two opposed, parallel hydraulic cylinders that are disposed in fluid communication with each other via fluid connectors to form a closed-loop hydraulic system. Each of the two hydraulic cylinders include cylinder housings that define substantially equivalent volumes but that have different cylinder geometries. The hydraulic advancement/postponement assembly is configured to adjust the velocity of a second ejector plate in response to the movement of a first ejector plate of an injection mold assembly. For example, movement of the first ejector plate and the first cylinder housing at a first rate causes fluid to flow between the first and second hydraulic cylinders. Translation of the second ejector plate can remove a molded article from an associated mold.

In one arrangement, the hydraulic advancement/postponement assembly can be configured as a hydraulic advancement or accelerator assembly. For example, the first hydraulic cylinder housing can have a relatively large diameter and a relatively short length while the second hydraulic cylinder housing can have a relatively small diameter and a relatively large length. Based upon these geometries of the first and second hydraulic cylinders, movement of the first ejector plate, and the fluid flow between the first and second hydraulic cylinders, causes a piston of the second hydraulic cylinder and the corresponding second ejector plate to translate at a second, faster rate relative to the first ejector plate.

In one arrangement, the hydraulic advancement/postponement assembly can be configured as a hydraulic postponement or delay assembly. For example, the first hydraulic cylinder housing can have a relatively small diameter and a relatively large length while the second hydraulic cylinder housing can have a relatively large diameter and a relatively small length. Based upon these geometries, movement of the first ejector plate, and the fluid flow between the first and second hydraulic cylinders, causes the piston of the second hydraulic cylinder and the corresponding second ejector plate to translate at a second, slower rate relative to the first ejector plate.

With these configurations, the hydraulic advancement/postponement assembly can position the second ejector plate at a different rate than the first ejector plate, either during an ejection procedure or when returning the first and second ejector plates to an initial position, without requiring the use of mechanical components, such as conventional the rack and pinion mechanisms.

With an absence of mechanical components, the hydraulic advancement/postponement assembly minimizes wear in an associated injection mold system. For example, with every molding cycle, the hydraulic advancement/postponement assembly operates twice. Specifically, the hydraulic advancement/postponement assembly moves the second ejector plate from an initial position to an ejection position and then from the ejection position back to the initial position. With such motion, a hydraulic advancement/postponement assembly having mechanical components would experience mechanical wear at twice the wear rate.

Also with an absence of mechanical components, the hydraulic advancement/postponement assembly provides relatively smooth translation of the first and second ejector plates during operation with minimal, if any, delay during operation. Further, in the case of the hydraulic accelerator assembly, with the absence of mechanical components, an increase in the operating speed of the hydraulic advancement/postponement assembly relative to conventional ejector accelerators minimally affects the wear rate of the hydraulic advancement/postponement assembly components, if at all.

In one arrangement, a hydraulic advancement/postponement assembly includes a first ejector plate and a second ejector plate opposing the first ejector plate. The hydraulic advancement/postponement assembly includes a first hydraulic cylinder having a first housing defining a first housing volume and a first piston at least partially disposed within the first housing, the first housing connected to the first ejector plate and the first piston connected to a fixed element. The hydraulic advancement/postponement assembly includes a second hydraulic cylinder disposed in fluid communication with the first hydraulic cylinder, the second hydraulic cylinder having a second housing defining a second housing volume and a second piston at least partially disposed within the second housing, the second housing connected to the first ejector plate and the second piston connected to the second ejector plate. The first housing volume is substantially equal to the second housing volume, the first housing defining a first diameter and a first length, and the second housing defining a second diameter and a second length, the second diameter being less than the first diameter and the second length being greater than the first length. Translation of the first ejector plate and the first housing between a first position and a second position at a first rate is configured to position the second piston of the second hydraulic cylinder and the second ejector plate between the first position and the second position at a second rate, the second rate being greater than the first rate.

In one arrangement, a hydraulic advancement/postponement assembly includes a first ejector plate and a second ejector plate opposing the first ejector plate. The hydraulic advancement/postponement assembly includes a first hydraulic cylinder having a first housing defining a first housing volume and a first piston at least partially disposed within the first housing, the first housing connected to the first ejector plate and the first piston connected to a fixed element. The hydraulic advancement/postponement assembly includes a second hydraulic cylinder disposed in fluid communication with the first hydraulic cylinder, the second hydraulic cylinder having a second housing defining a second housing volume and a second piston at least partially disposed within the second housing, the second housing connected to the first ejector plate and the second piston connected to the second ejector plate. The first housing volume is substantially equal to the second housing volume, the first housing defining a first diameter and a first length, and the second housing defining a second diameter and a second length, the second diameter being greater than the first diameter and the second length being less than the first length. Translation of the first ejector plate and the first housing between a first position and a second position at a first rate is configured to position the second piston of the second hydraulic cylinder and the second ejector plate between the first position and the second position at a second rate, the second rate being less than the first rate.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a hydraulic advancement/postponement assembly. The hydraulic advancement/postponement assembly can include two opposed, parallel hydraulic cylinders that are disposed in fluid communication with each other via fluid connectors to form a closed-loop hydraulic system. Each of the two hydraulic cylinders include cylinder housings that define substantially equivalent volumes but that have different cylinder geometries. The hydraulic advancement/postponement assembly is configured to adjust the velocity of a second ejector plate in response to the movement of a first ejector plate of an injection mold assembly. For example, movement of the first ejector plate and the first cylinder housing at a first rate causes fluid to flow between the first and second hydraulic cylinders. Translation of the second ejector plate can remove a molded article from an associated mold.

In one arrangement, the hydraulic advancement/postponement assembly can be configured as a hydraulic advancement or accelerator assembly. For example, the first hydraulic cylinder housing can have a relatively large diameter and a relatively short length while the second hydraulic cylinder housing can have a relatively small diameter and a relatively large length. Based upon these geometries of the first and second hydraulic cylinders, movement of the first ejector plate, and the fluid flow between the first and second hydraulic cylinders, causes a piston of the second hydraulic cylinder and the corresponding second ejector plate to translate at a second, faster rate relative to the first ejector plate.

In one arrangement, the hydraulic advancement/postponement assembly can be configured as a hydraulic postponement or delay assembly. For example, the first hydraulic cylinder housing can have a relatively small diameter and a relatively large length while the second hydraulic cylinder housing can have a relatively large diameter and a relatively small length. Based upon these geometries, movement of the first ejector plate, and the fluid flow between the first and second hydraulic cylinders, causes the piston of the second hydraulic cylinder and the corresponding second ejector plate to translate at a second, slower rate relative to the first ejector plate.

With these configurations, the hydraulic advancement/postponement assembly can position the second ejector plate at a different rate than the first ejector plate, either during an ejection procedure or when returning the first and second ejector plates to an initial position, without requiring the use of mechanical components, such as conventional the rack and pinion mechanisms.

Figure 1:
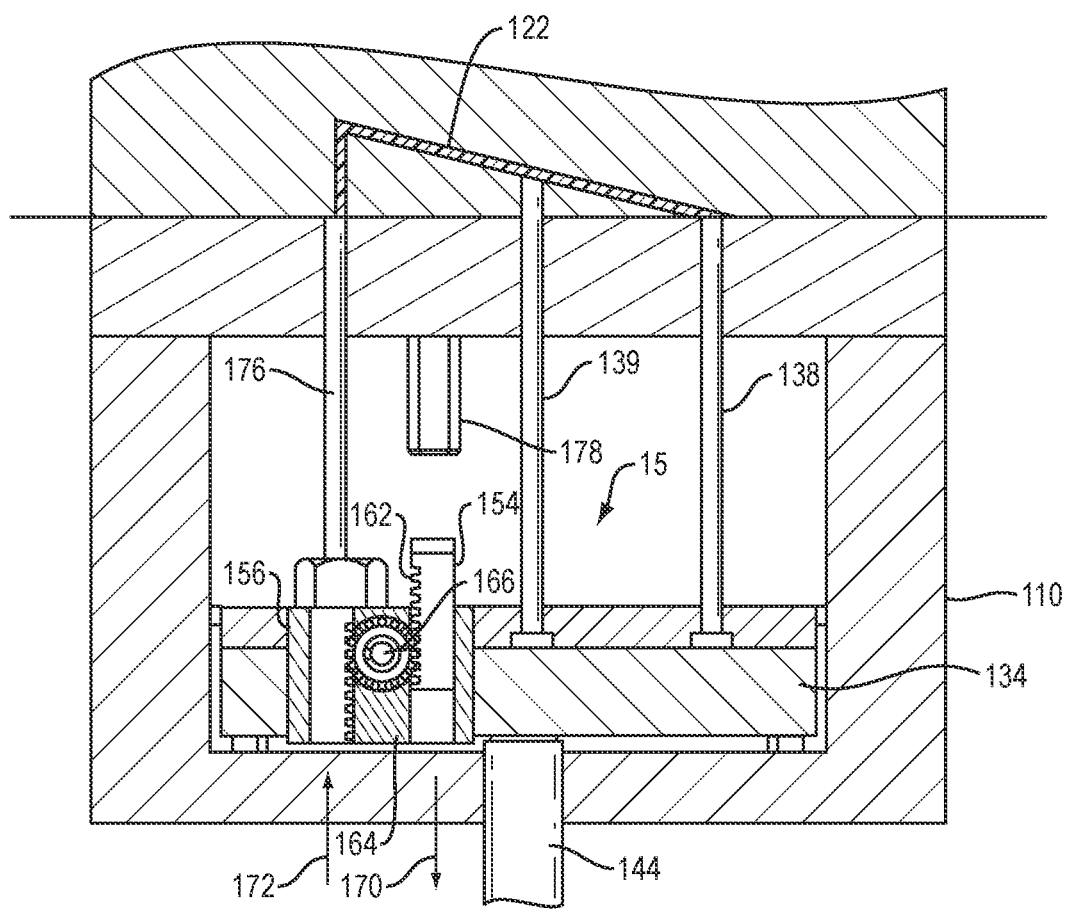
FIG. 1 illustrates a prior art ejector accelerator.
Figure 2:
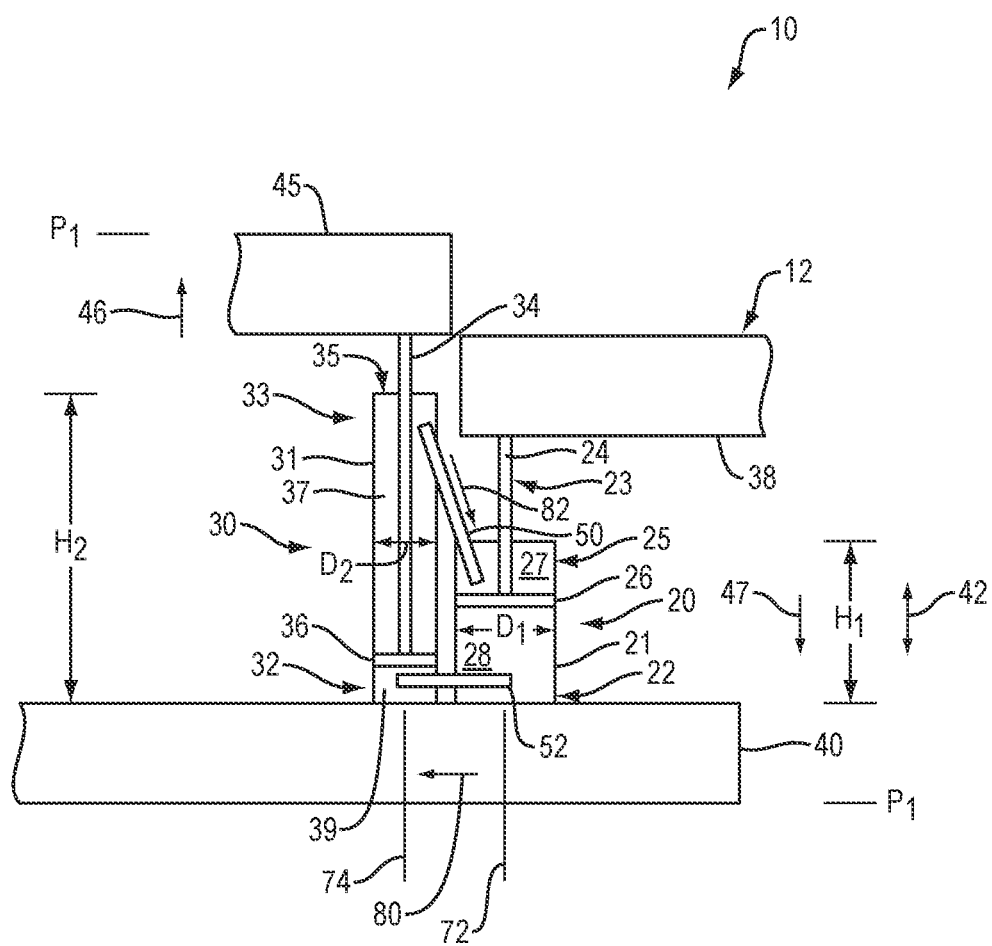
FIG. 2 illustrates a schematic, sectional depiction of a hydraulic advancement/postponement assembly disposed in a first position, according to one arrangement.

FIG. 2 illustrates a schematic, sectional depiction of an injection mold system 10, according to one arrangement. The injection mold system 10 includes a hydraulic advancement/postponement assembly 12 having a first hydraulic cylinder 20 and a second hydraulic cylinder 30, as well as a first ejector plate 40 and a second ejector plate 45. The injection mold system 10 further includes a driver element (not shown) connected to the first ejector plate 40, as well as a molding plate (not shown) connected to the second ejector plate 45. As will be described in detail below, actuation of the first ejector plate 40 by the driver element causes translation of the second ejector plate 45 to eject a molded article from the molding plate.

As provided above, the hydraulic advancement/postponement assembly 12 includes a first hydraulic cylinder 20 and a second hydraulic cylinder 30. As illustrated, the first and second hydraulic cylinders 20, 30 can be disposed in relatively close proximity to each other (i.e., in opposition to each other) with a longitudinal axis 72 of the first hydraulic cylinder 20 being substantially parallel to a longitudinal axis 74 of the second hydraulic cylinder 30.

The first hydraulic cylinder 20 is configured as a substantially hollow, cylindrically-shaped housing 21 having a first end 22 connected to the moveable mold plate 40. The first hydraulic cylinder 20 also at least partially contains a first piston assembly 23 having a first piston 24 extending from a second end 25 of the housing 21 and connected to a fixed element 38 of the injection mold system 10. The first piston assembly 23 also includes a first ram 26 connected to the first piston 24. In one arrangement, the first ram 26 divides the housing 21 into first and second chambers 27, 28 having variable volumes. For example, and as will be described in detail below, translation of the first ejector plate 40 along direction 42 causes the housing 21 to translate relative to the first ram 26 and to adjust the relative volumes of the first and second chambers 27, 28.

The second hydraulic cylinder 30 is configured as a substantially hollow, cylindrically-shaped housing 31 having a first end 32 connected to the moveable mold plate 40. The second hydraulic cylinder 30 also at least partially contains a second piston assembly 33 having a second piston 34 extending from a second end 35 of the housing 31 and connected to the second ejector plate 45 of the injection mold system 10. The second piston assembly 33 also includes a second ram 36 connected to the second piston 34. In one arrangement, the second ram 36 divides the housing 31 into first and second chambers 37, 39 having variable volumes.

Each of the two cylinder housings 21, 31 define substantially equivalent volumes. For example, the sum of the volumes of the first and second chambers 27, 28 of the first housing 21 is substantially equal to the sum of the volumes of the first and second chambers 37, 39 of the second housing 31. Each cylinder housing 21, 31, however, defines distinct geometrical configurations. For example, the first cylinder housing 21 defines an internal cylinder housing 21 and first ram 26 diameter $D_1$ which is larger than an internal cylinder housing 31 and second ram 36 diameter $D_2$ defined by the second cylinder housing 31. Further, the first cylinder housing 21 defines a length or height $H_1$ which is smaller than a length or height $H_2$ of the second cylinder housing 31. The ratio of the internal diameter $D_1$ of the first cylinder housing 21 to the internal diameter $D_2$ of the second cylinder housing 31 controls the speed of the second piston 34 during operation while the ratio of the height $H_1$ of the first cylinder housing 21 to the height $H_2$ of the second cylinder housing 31 controls the stroke length of the second piston 34 during operation.

Also as illustrated in FIG. 2, the first hydraulic cylinder 20 and the second hydraulic cylinder 30 are disposed in fluid communication with each other. For example, the hydraulic advancement/postponement assembly 12 includes a first fluid connector 50 disposed in fluid connection with the first chamber 27 of the first hydraulic cylinder 20 and with the first chamber 37 of the second hydraulic cylinder 30. The hydraulic advancement/postponement assembly 12 also includes a second fluid connector 52 disposed in fluid connection with the second chamber 28 of the first hydraulic cylinder 20 and with the second chamber 39 of the second hydraulic cylinder 30. In this arrangement, the hydraulic cylinders 20, 30 and fluid connectors 50, 52 define a closed hydraulic system. Further, while the first and second hydraulic cylinders 20, 30 and fluid connectors 50, 52 can contain a variety of fluids, in one arrangement, an incompressible fluid, such as hydraulic oil, can be utilized.

In one arrangement, the first ejector plate 40 is configured as a linearly translatable element. For example, the first ejector plate 40 connects to a driver element (not shown) of the injection mold system 10. Translation of the first ejector plate 40 along direction 43 by the driver element controls the translation of both the first cylinder housing 21 and the second cylinder housing 31.

In the arrangement shown, and as provided above, the first piston 24 is connected to the fixed element 38. The fixed element 38 is configured as a substantially nonmoving portion within the injection mold system 10 and remains stationary relative to the movement of the first ejector plate 40. As will be described below, the fixed element 38 limits or prevents translation of the translation of the first piston assembly 23 as the first ejector plate 40 translates the first cylinder housing 21 along direction 43.

In one arrangement, the second ejector plate 45 is configured as a linearly translatable element. For example, as indicated above, the second ejector plate 45 is connected to the second piston assembly 33 as well as to a molding plate (not shown). As will be described below, translation of the first ejector plate 40 along direction 43 controls the translation of the second piston assembly 33 and second ejector plate 45.

Figure 3:
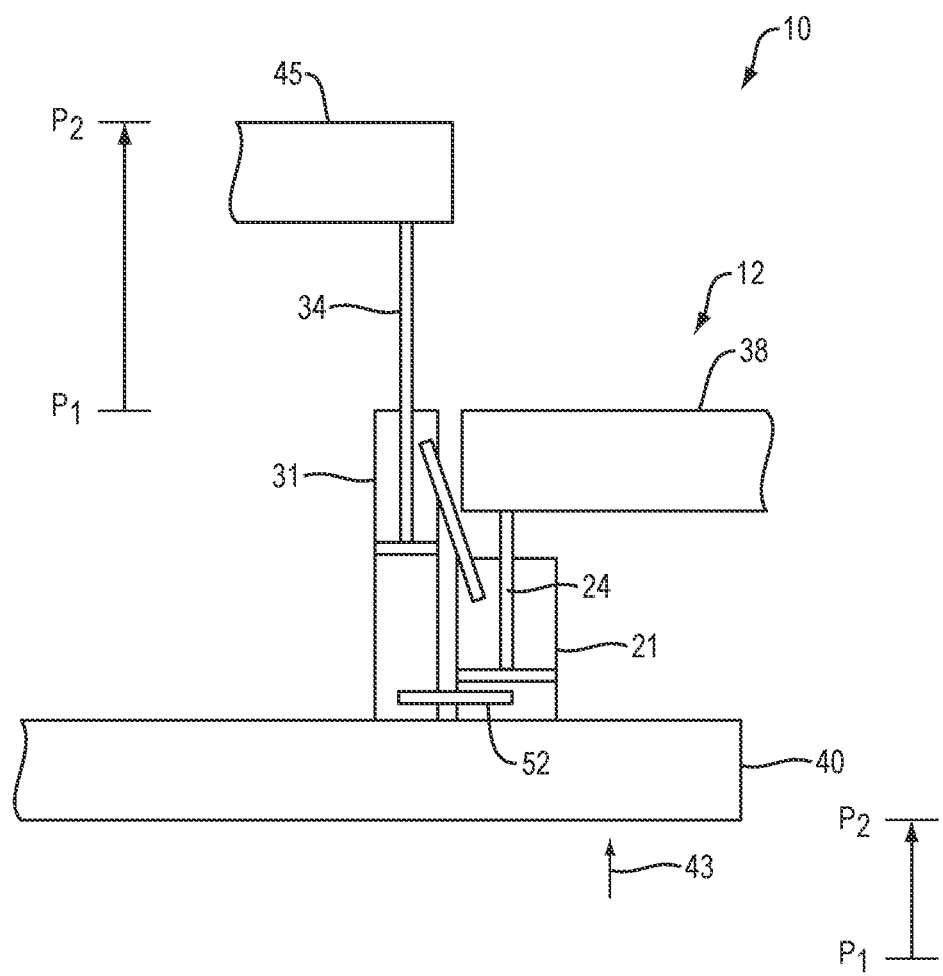
FIG. 3 illustrates a schematic, sectional depiction of the hydraulic advancement/postponement assembly of FIG. 2 disposed in a second position, according to one arrangement.

During operation, the hydraulic advancement/postponement assembly 12 is configured to move between a first position, $P_1$, as shown in FIG. 2 and a second position, $P_2$, as shown in FIG. 3. A description of the operation of the hydraulic advancement/postponement assembly 12 is provided below.

As illustrated in FIG. 2, as the first ejector plate 40 moves from the first position, $P_1$ along direction 43, because the first piston 24 is connected to the fixed element 38, the fixed element 38 maintains the longitudinal position of the first piston 24. The first cylinder housing 20 translates relative to the first ram 26 from the first position $P_1$ to the second position $P_2$, shown in FIG. 3. Accordingly, the movement of the first cylinder housing 21 forces fluid contained in the second chamber 28 of the first hydraulic cylinder 20 to flow along direction 80 into the second chamber 39 of the second hydraulic cylinder 30 via the fluid connector 52. Flow of the fluid into the second chamber 39 of the second hydraulic cylinder 30 causes the second piston 34 to translate along the direction 46 to translate the second ejector plate 45 from the first position $P_1$ to the second position $P_2$, shown in FIG. 3. Further, with reference to FIG. 2, translation of the second piston 34 causes fluid contained within the first chamber 37 of the second hydraulic cylinder 30 to flow into the first chamber 27 of the first hydraulic cylinder 20 along direction 82 via the fluid connector 50.

Based upon the relative geometries of the first and second hydraulic cylinders 20, 30 motion of the first ejector plate 40 and the first cylinder housing 20 at a first rate causes the piston 34 of the second hydraulic cylinder 30 to translate at a second rate. For example, an internal diameter ratio $D_1:D_2$ of 2:1 can be utilized to adjust the translation rate of the second ejector plate 45 to be approximately twice that of the translation rate of the first ejector plate 40. Accordingly, the hydraulic advancement/postponement assembly 12 is configured to accelerate the second ejector plate 45 at a faster rate (e.g., double) than the rate of the first ejector plate 40. Further, the height ratio $H_1:H_2$ of the first and second cylinder housings 21, 31 controls the stroke length of the second piston 34 during operation. For example, a height ratio of $H_1:H_2$ 1:2 can be utilized to adjust the stroke length of the second piston 34 to be approximately twice that of the stroke length of the first ejector plate 40.

As indicated in FIG. 3, in response to translation of the second ejector plate 45 from the first position $P_1$ to the second position $P_2$ to eject a molded article from a corresponding molding plate. Once the ejection process has been completed, the translation of the components and fluid flow is reversed to place the hydraulic advancement/postponement assembly 12 in a starting position for a subsequent ejection without the use of mechanical force or devices, such as springs.

As provided above, the hydraulic advancement/postponement assembly 12 operates via hydraulic displacement and can accelerate the second ejector plate 45 without requiring the use of mechanical components, such as conventional the rack and pinion mechanisms. The hydraulic advancement/postponement assembly 12, therefore minimizes component wear within a mold system over time. Further, with the hydraulic advancement/postponement assembly 12 configured as a closed-loop hydraulic system, the load transfer between the first and second hydraulic cylinders 20, 30 is set as a ratio of substantially 1:1. Therefore, the energy required to accelerate the piston 34 of the second hydraulic cylinder 30 is minimal and provides a relatively high level of efficiency. Also, because the ejector assembly 12 operates via hydraulic displacement because there is minimal, if any, delay in actuation of the second ejector plate 45 during operation.

The hydraulic advancement/postponement assembly 12 provides a variety of benefits. For example, the hydraulic advancement/postponement assembly 12 does not include mechanical moving components, is not limited in its operating velocity, can support a relatively heavier load relative to conventional mechanical systems, has a relatively longer operating life than conventional mechanical systems, and can provide a relatively long, and adjustable, stroke length.

Figure 4:
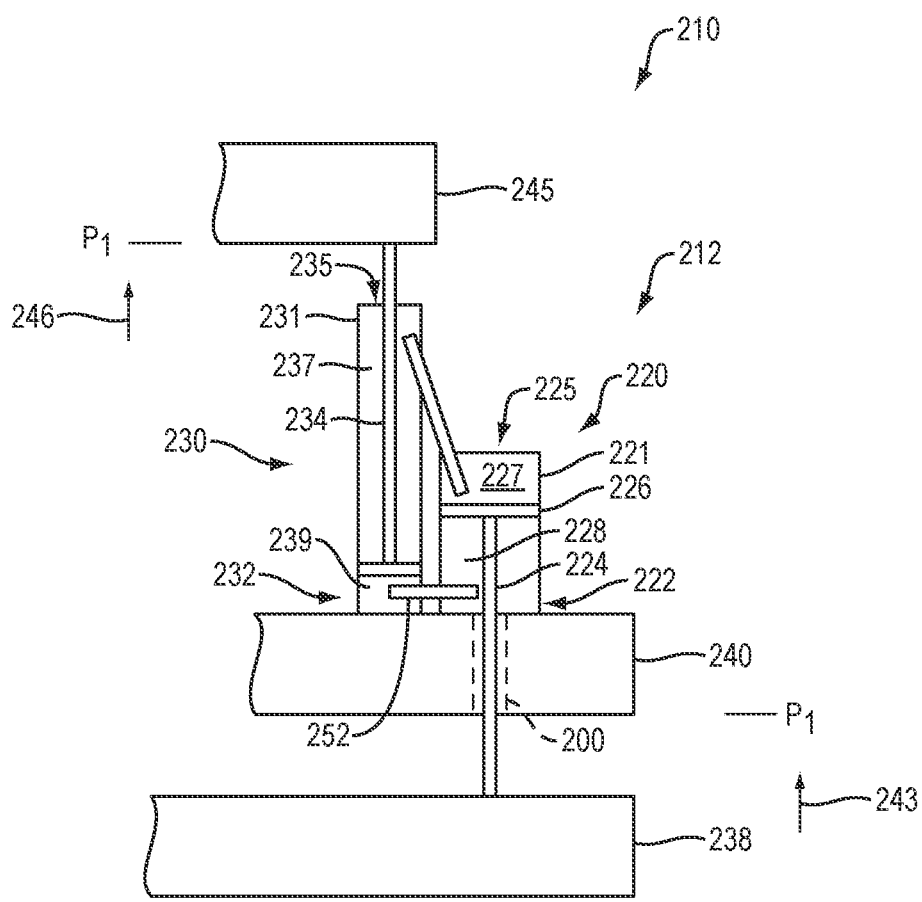
FIG. 4 illustrates a schematic, sectional depiction of a hydraulic advancement/postponement assembly, according to one arrangement.

FIG. 4 illustrates an alternate configuration of the injection mold system 210, according to one arrangement. As illustrated, the injection mold system 210 includes a hydraulic advancement/postponement assembly 212 configured to move the second ejector plate 245 in response to the movement of the first ejector plate 240 of an injection mold system 210. A first hydraulic cylinder 220 includes a substantially hollow, cylindrically-shaped housing 221 having a first end 222 connected to the first ejector plate 240 and having a first piston 224 extending from the first end 222 of the housing 221. For example, first piston 224 can extend through an opening 200 defined by the first ejector plate 240 and can be connected to a fixed element 238 of the injection mold system 210. In one arrangement, a fluid seal can be disposed between the wall of the opening 200 and the first piston 224 to limit the flow of fluid from a second chamber 228 of the housing 221 through the opening 200.

A second hydraulic cylinder 230 is configured as a substantially hollow, cylindrically-shaped housing 231 having a first end 232 connected to the moveable mold plate 240. The second hydraulic cylinder 230 also at least partially contains a second piston assembly 233 having a second piston 234 extending from a second end 235 of the housing 231 and connected to a second ejector plate 245 of the injection mold system 210. The second piston 234 extends from the second housing 231 along a second direction which is opposite to the direction of the first piston 224 from the first hydraulic cylinder 220.

Figure 5:
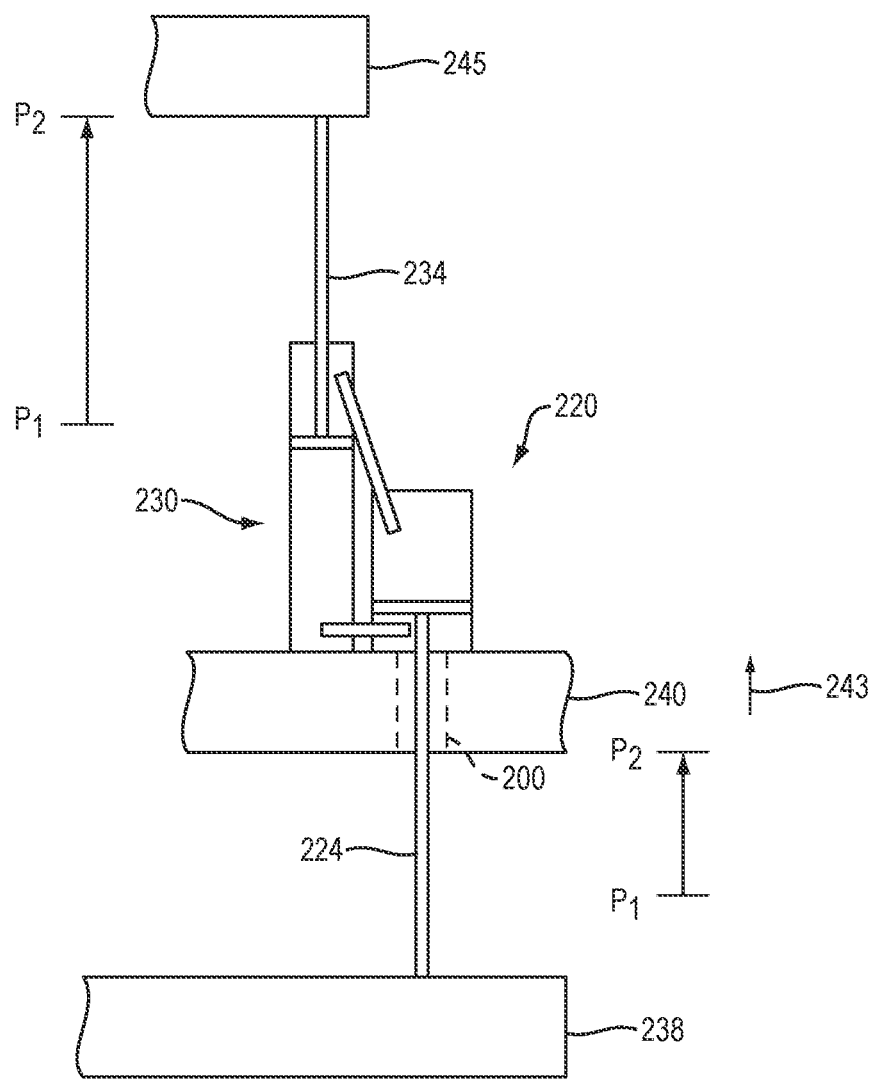
FIG. 5 illustrates a schematic, sectional depiction of the hydraulic advancement/postponement assembly of FIG. 4 disposed in a second position, according to one arrangement.

During operation, the hydraulic advancement/postponement assembly 212 is configured to move between a first position, $P_1$, as shown in FIG. 4 and a second position, $P_2$, as shown in FIG. 5. A description of the operation of the hydraulic advancement/postponement assembly 212 is provided below.

As illustrated in FIG. 4, as the first ejector plate 240 moves from the first position, $P_1$ along direction 243, because the first piston 224 is connected to the fixed element 238 through opening 200, the first cylinder housing 220 translates relative to the first ram 226 from the first position $P_1$ to the second position $P_2$, shown in FIG. 5. Accordingly, the movement of the first cylinder housing 220 forces fluid contained in the second chamber 228 of the first hydraulic cylinder 220 to flow into a second chamber 239 of the second hydraulic cylinder 30 via fluid connector 252. Flow of the fluid into the second chamber 239 of the second hydraulic cylinder 230 causes the piston 234 to translate along the direction 246 to translate the second ejector plate 245 from the first position $P_1$ to the second position $P_2$, shown in FIG. 5. Further, translation of the piston 234 causes fluid contained within the first chamber 237 of the second hydraulic cylinder 230 to flow into the first chamber 227 of the first hydraulic cylinder 220.

Based upon the relative geometries of the first and second hydraulic cylinders 220, 230 (e.g., an internal diameter ratio $D_1:D_2$ of 2:1), linear motion of the first ejector plate 40 and the first cylinder housing 220 at a first rate causes the piston 234 of the second hydraulic cylinder 230 to translate at a second rate. Accordingly, the hydraulic advancement/postponement assembly 212 is configured to accelerate the second ejector plate 245 at a faster rate (e.g., double) than the rate of the first ejector plate 240.

As provided above, the hydraulic advancement/postponement assembly 12 is configured as an ejector accelerator to increase the velocity of the second ejector plate 40 relative to the velocity of the first ejector plate 38. However, the hydraulic advancement/postponement assembly 12 can be configured as an ejector decelerator or delay which delays the ejection molded material from a mold. For example, following certain molding processes, a mold plate can contain both a molded article and a runner or waste associated with the molded article. In this case, in order to stagger the timing of the ejection of the molded article and runner from the mold plate, the manufacturer can utilize an ejector decelerator to delay ejection of the runner from the mold plate, following ejection of the molded article.

Figure 6:
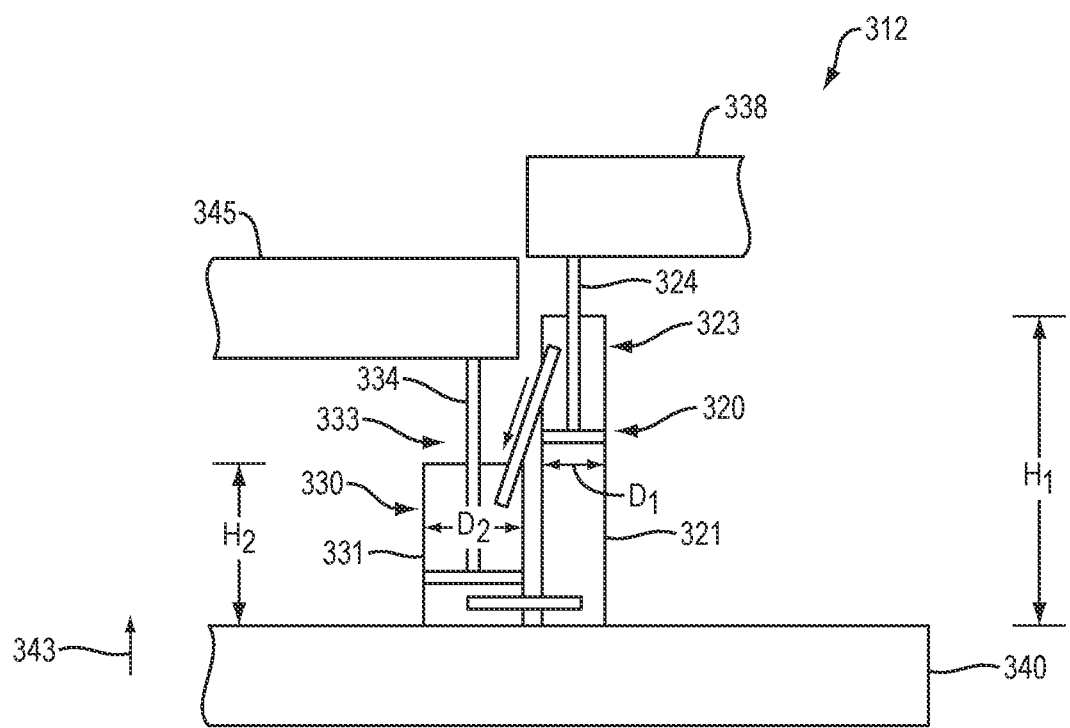
FIG. 6 illustrates schematic, sectional depiction of a hydraulic advancement/postponement assembly configured as an ejection decelerator, according to one arrangement.

FIG. 6 illustrates a schematic, sectional depiction of a hydraulic advancement/postponement assembly 312 configured as an ejection decelerator, according to one arrangement. As shown, first and second hydraulic cylinders 320, 330 are disposed in relatively close proximity to each other in a parallel arrangement. Each of the first and second hydraulic cylinders 320, 330 have a corresponding hollow, cylindrically-shaped housing 321, 331, each of which at least partially contains first and second piston assemblies 323, 333, respectively. The first piston assembly 323 includes a first piston 324 having a first end connected to a fixed element 338 while the second piston assembly includes a second piston 334 having a first end connected to a second ejector plate 45.

Each of the two cylinder housings 321, 331 define substantially equivalent volumes with distinct geometrical configurations. For example, the first cylinder housing 321 defines an internal cylinder housing and first ram diameter $D_1$ which is smaller than an internal cylinder housing and second ram diameter $D_2$ defined by the second cylinder housing 331. Further, the first cylinder housing 321 defines a length or height $H_1$ which is greater than a length or height $H_2$ of the second cylinder housing 331. The ratio of the internal diameter $D_1$ of the first cylinder housing 321 to the internal diameter $D_2$ of the second cylinder housing 331 controls the speed of the second piston 334 during operation while the ratio of the height $H_1$ of the first cylinder housing 321 to the height $H_2$ of the second cylinder housing 331 controls the stroke length of the second piston 334 during operation.

Based upon the relative geometries of the first and second hydraulic cylinders 320, 330 motion of the first ejector plate 340 and the first cylinder housing 320 along direction 343 at a first rate causes the piston 334 of the second hydraulic cylinder 330 to translate at a second rate. For example, an internal diameter ratio $D_1:D_2$ of 1:2 can be utilized to adjust the translation rate of the second ejector plate 345 to be approximately half of the translation rate of the first ejector plate 340. Accordingly, the hydraulic advancement/postponement assembly 312 is configured to translate the second ejector plate 345 at a slower rate (e.g., half) than the rate of the first ejector plate 340. Further, the height ratio $H_1:H_2$ of the first and second cylinder housings 321, 331 controls the stroke length of the second piston 334 during operation. For example, a height ratio of $H_1:H_2$ of 2:1 can be utilized to adjust the stroke length of the second piston 334 to be approximately half that of the stroke length of the first ejector plate 340.

Figure 7:
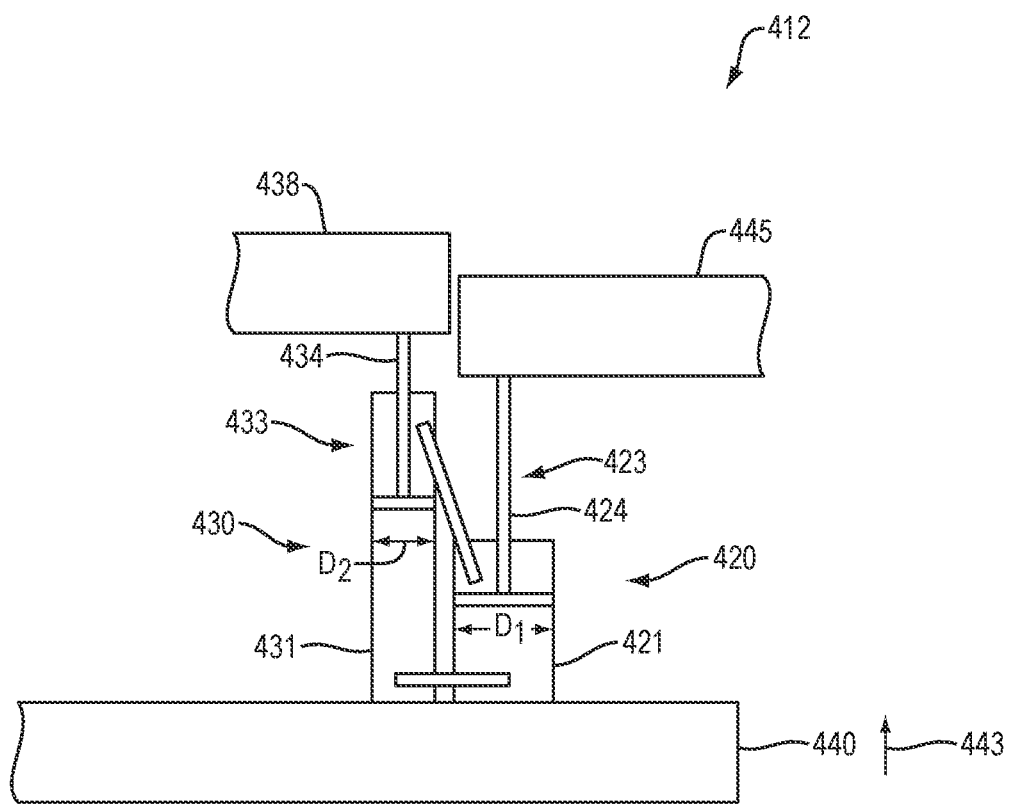
FIG. 7 illustrates schematic, sectional depiction of a hydraulic advancement/postponement assembly configured as an ejection decelerator, according to one arrangement.

As indicated in FIG. 6, hydraulic advancement/postponement assembly 12 of FIG. 2 can be configured as an ejection decelerator by reversing the position of the first and second hydraulic cylinders 20, 30 relative to the fixed element 38 and to the second ejector plate 45. In one arrangement, a hydraulic advancement/postponement assembly can be configured as an ejection decelerator by reversing the position of the fixed element 38 and the second ejector plate 45 relative to the first and second hydraulic cylinders 20, 30. For example, FIG. 7 illustrates a first hydraulic cylinder 420 having a first cylinder housing 421 defining an internal cylinder housing and first ram diameter $D_1$. The diameter $D_1$ is larger than an internal cylinder housing and second ram diameter $D_2$ defined by the second cylinder housing 431 of a second hydraulic cylinder 430. A first piston assembly 423 of the first cylinder housing 421 includes a first piston 324 having a first end connected to a second ejector plate 445. A second piston assembly 433 includes a second piston 434 having a first end connected to a fixed element 438.

Based upon the relative geometries of the first and second hydraulic cylinders 420, 430 motion of the first ejector plate 440 and the first cylinder housing 420 along direction 443 at a first rate causes the first piston 424 of the first hydraulic cylinder 420 and the second ejector plate 445 to translate at a second rate, which is less than the first rate.

While not illustrated, in one arrangement, the hydraulic advancement/postponement assembly 12 is provided as a one-size-fits-all assembly. In such a case, the hydraulic advancement/postponement assembly 12 can be configured to allow various ratios of acceleration to be obtained between the second ejector plate 45 and the first ejector plate 40. For example, the internal diameter for each housing 21, 31 can be adjusted by utilizing housing inserts of varying diameters, along with correspondingly-sized rams, to create a variety of internal diameter ratios $D_1:D_2$. In another example, the height of each housing 21, 31 can be increased or decreased through the addition or removal of cylindrical housing elements along the longitudinal axes of the housings 21, 31 to create a variety of height ratios $H_1:H_2$. In yet another example, a mechanical stop can be utilized to limit movement of the pistons 24, 34. For example, the mechanical stop can be configured to allow a particular stroke distance within the mold assembly.

While various embodiments of the innovation have been particularly shown and described, it will be understood by those skilled in the art that various changes in form and details may be made therein without departing from the spirit and scope of the innovation as defined by the appended claims.

What is claimed is:

1. A hydraulic advancement/postponement assembly, comprising:
   a first hydraulic cylinder having a first housing, the first housing having a first internal diameter and a first length defining a first volume and a first piston at least partially disposed within the first volume, the first housing configured to be connected to a first moveable element and the first piston configured to be connected to a fixed element; and a second hydraulic cylinder disposed in fluid communication with the first hydraulic cylinder and having a second housing, the second housing having a second internal diameter and a second length defining a second volume and a second piston at least partially disposed within the second volume, the second housing configured to be connected to the first moveable element and the second piston configured to be connected to a second moveable element;

wherein the first volume is substantially equal to the second volume, the second internal diameter being less than the first internal diameter and the second length being greater than the first length.

2. The hydraulic advancement/postponement assembly of claim 1, wherein the first hydraulic cylinder is configured to be coupled to the first moveable element at a first location and the second hydraulic cylinder is configured to be coupled to the first moveable element at a second location, the first location being distinct from the second location and a first longitudinal axis of the first hydraulic cylinder being substantially parallel to a second longitudinal axis of the second hydraulic cylinder.

3. The hydraulic advancement/postponement assembly of claim 1, wherein:

the first hydraulic cylinder further comprises a first ram connected to the first piston and moveably disposed within the first housing, the first ram defining a first chamber within the first housing and defining a second chamber within the first housing; and the second hydraulic cylinder further comprises a second ram connected to the second piston and moveably disposed within the second housing, the second ram defining a first chamber within the second housing and defining a second chamber within the second housing.

4. The hydraulic advancement/postponement assembly of claim 3, comprising:

a first fluid connector disposed in fluid communication with the first chamber of the first housing and with the first chamber of the second housing; and a second fluid connector disposed in fluid communication with the second chamber of the first housing and the second chamber of the second housing.

5. The hydraulic advancement/postponement assembly of claim 1, wherein:

the first piston extends from the first housing along a first direction; and the second piston extends from the second housing along the first direction.

6. The hydraulic advancement/postponement assembly of claim 1, wherein:

the first piston extends from the first housing along a first direction; and the second piston extends from the second housing along a second direction, the second direction opposing the first direction.

7. The hydraulic advancement/postponement assembly of claim 6, wherein the first piston is configured to extend through an opening defined by the first moveable element and connect to the fixed element.

8. A hydraulic advancement/postponement assembly, comprising:

a first hydraulic cylinder having a first housing, the first housing having a first internal diameter and a first length defining a first volume and a first piston at least partially disposed within the first volume, the first housing configured to be connected to a first moveable element and the first piston configured to be connected to a fixed element; and a second hydraulic cylinder disposed in fluid communication with the first hydraulic cylinder and having a second housing, the second housing having a second internal diameter and a second length defining a second volume and a second piston at least partially disposed within the second volume, the second housing configured to be connected to the first moveable element and the second piston configured to be connected to a second moveable element;

wherein the first volume is substantially equal to the second volume, the second internal diameter being greater than the first internal diameter and the second length being less than the first length.

9. The hydraulic advancement/postponement assembly of claim 8, wherein the first hydraulic cylinder is configured to be coupled to the first moveable element at a first location and the second hydraulic cylinder is configured to be coupled to the first moveable element at a second location, the first location being distinct from the second location and a first longitudinal axis of the first hydraulic cylinder being substantially parallel to a second longitudinal axis of the second hydraulic cylinder.

10. The hydraulic advancement/postponement assembly of claim 8, wherein:

the first hydraulic cylinder further comprises a first ram connected to the first piston and moveably disposed within the first housing, the first ram defining a first chamber within the first housing and defining a second chamber within the first housing; and the second hydraulic cylinder further comprises a second ram connected to the second piston and moveably disposed within the second housing, the second ram defining a first chamber within the second housing and defining a second chamber within the second housing.

11. The hydraulic advancement/postponement assembly of claim 10, comprising:

a first fluid connector disposed in fluid communication with the first chamber of the first housing and with the first chamber of the second housing; and a second fluid connector disposed in fluid communication with the second chamber of the first housing and the second chamber of the second housing.

12. The hydraulic advancement/postponement assembly of claim 8, wherein:

the first piston extends from the first housing along a first direction; and the second piston extends from the second housing along the first direction.

13. The hydraulic advancement/postponement assembly of claim 8, wherein:

the first piston extends from the first housing along a first direction; and the second piston extends from the second housing along a second direction, the second direction opposing the first direction.

14. The hydraulic advancement/postponement assembly of claim 13, wherein the first piston is configured to extend through an opening defined by the first moveable element and connect to the fixed element.

* * * * *